US011290427B2

(12) United States Patent
Ahani

(10) Patent No.: US 11,290,427 B2
(45) Date of Patent: Mar. 29, 2022

(54) DYNAMIC CLIENT REFERRAL AND SECURE INFORMATION TRANSMISSION BETWEEN SERVICE PROVIDERS

(71) Applicant: Project Revamp, Inc., Hillsborough, CA (US)

(72) Inventor: Hessam Ahani, Hillsborough, CA (US)

(73) Assignee: Project Revamp, Inc., Hillsborough, CA (US)

( * ) Notice: Subject to any disclaimer, the term of this patent is extended or adjusted under 35 U.S.C. 154(b) by 343 days.

(21) Appl. No.: 16/717,075

(22) Filed: Dec. 17, 2019

(65) Prior Publication Data
US 2020/0204523 A1    Jun. 25, 2020

Related U.S. Application Data

(60) Provisional application No. 62/783,074, filed on Dec. 20, 2018.

(51) Int. Cl.
*H04L 29/06* (2006.01)
*G06Q 30/02* (2012.01)
*H04L 67/51* (2022.01)
*H04L 67/53* (2022.01)

(52) U.S. Cl.
CPC ..... *H04L 63/0414* (2013.01); *G06Q 30/0281* (2013.01); *G06Q 30/0282* (2013.01); *H04L 63/0428* (2013.01); *H04L 63/10* (2013.01); *H04L 67/16* (2013.01); *H04L 67/20* (2013.01)

(58) Field of Classification Search
CPC . H04L 63/0414; H04L 63/0428; H04L 63/10; H04L 67/16; H04L 67/20; G06Q 30/0281; G06Q 30/0282
See application file for complete search history.

(56) References Cited

U.S. PATENT DOCUMENTS 10,552,839 B2 * 2/2020 Narasimhan ........... G06Q 20/14
10,826,931 B1 * 11/2020 Quan .................... G06F 21/566

FOREIGN PATENT DOCUMENTS

WO    WO-2017127804 A1 *  7/2017 ............. G06Q 10/02

* cited by examiner

*Primary Examiner* — Arvin Eskandarnia
(74) *Attorney, Agent, or Firm* — Perkins Coie LLP

(57) ABSTRACT

Techniques to securely and effectively implement a referral process between service providers. A platform may be generated to provide secure communication and information transmission between multiple authorized users. Authorized users may view information and communicate securely on an interactive dashboard. The platform can facilitate tracking of a client through a referral process. Particularly, the platform can allow for selective access to client information as a client is referred from a service provider to a referred service provider (or a "specialist"). The platform can securely share and store client information between the service provider and referred service provider. Further, the platform increases engagement between the client and service providers during the referral process.

29 Claims, 7 Drawing Sheets

DYNAMIC CLIENT REFERRAL AND SECURE INFORMATION TRANSMISSION BETWEEN SERVICE PROVIDERS

CROSS-REFERENCE TO RELATED APPLICATIONS

The present application claims priority to U.S. Provisional Patent Application No. 62/783,074, titled "TECHNIQUES FOR COMMUNICATING DYNAMICALLY AND MAINTAINING DATABASES IN A MANAGED SERVICES SETTING," and filed Dec. 20, 2018, which is incorporated by reference herein by its entirety.

TECHNICAL FIELD

The disclosed teachings generally relate to information transmission. The disclosed teachings more particularly relate to implementing a platform to securely and efficiently transmit information between devices during a referral process.

BACKGROUND

Managed service providers offer a variety of services to clients. For example, a dentist can provide dental services for a variety of clients. In many instances, various information for the service provider may be maintained electronically. For example, a service provider may maintain an electronically-stored record of upcoming appointments. As another example, a service provider may maintain information relating to clients electronically via a computing device (e.g., a server, computer).

In many cases, a service provider may identify that a client needs the services provided by another services provider. This may include identifying that a specialist in a field with a unique skillset or equipment is needed to assist the client. In this event, a service provider may refer the client to the referred services provider. Referring a client to a referred service provider may include identifying the referred service provider that can perform the required services for the client and informing the identified referred service provider of the client.

Based on an interaction between the service provider and the referred service provider, the client and referred service provider can schedule an appointment and have specialized services performed for the client. However, in many instances, the client and referred service provider may fail to make an appointment and keep the appointment.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
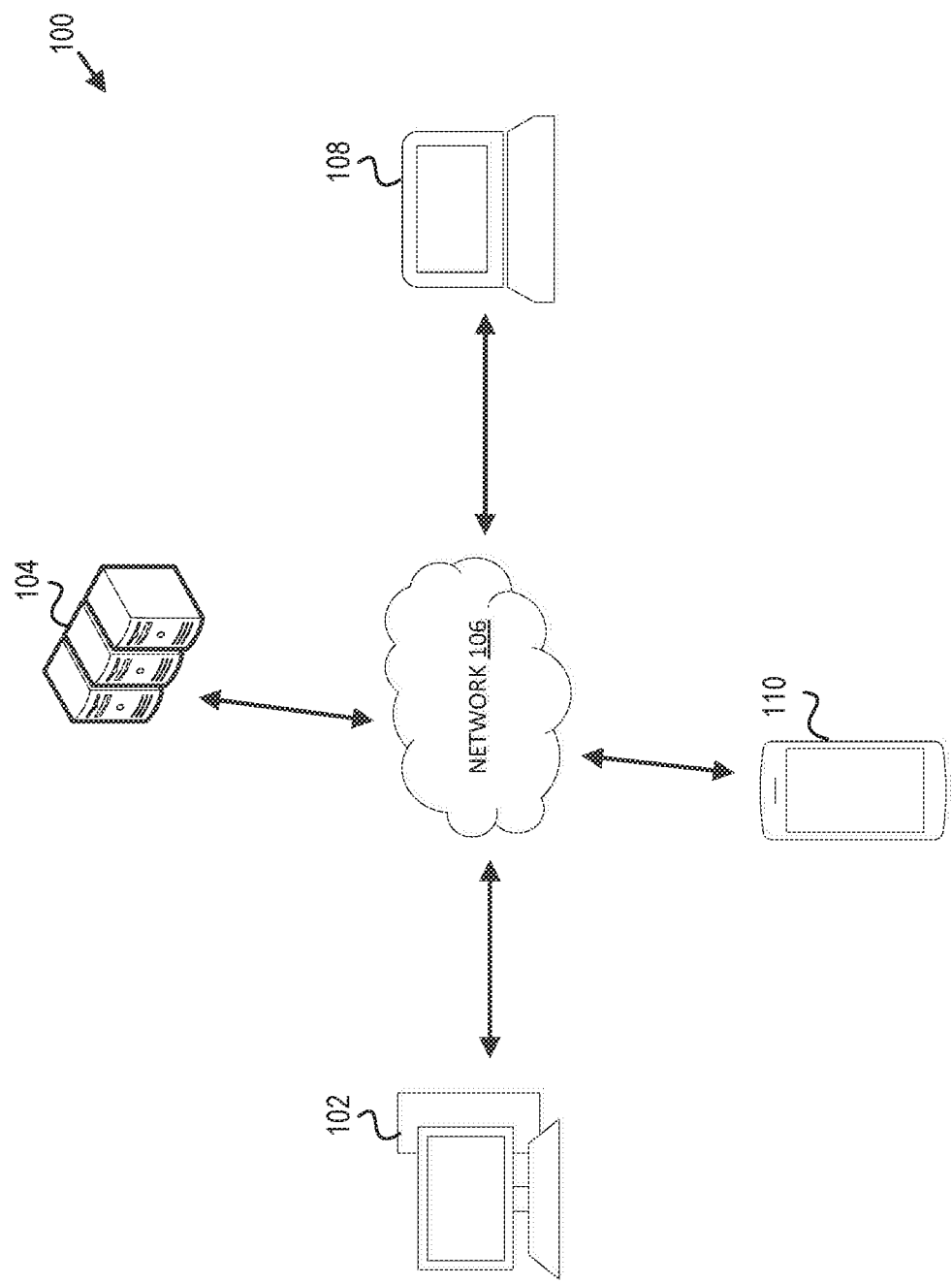
FIG. 1 is an illustration an example network environment to implement a dynamic referral process as described herein.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Service providers provide various services to clients. For example, a dentist performs dental services to clients. Further, in many cases, service providers provide unique services for clients. As an example, an oral surgeon can perform surgical procedures for clients. Accordingly, in many cases, a service provider can identify that the client may need to be referred to another service provider to have specific services performed for the client.

In a referral procedure, the service provider may refer a client to a referred service provider to perform specific services. For example, a dentist may refer a client to an oral surgeon to perform a surgical procedure the dentist is unable to perform. The service provider may generally identify the referred service provider and inform the referred service provider of the referred client. In many events, the referred service provider and the client may communicate to schedule an appointment. However, in many instances, this referred appointment may not be successfully executed for any of a variety of reasons. This may lead to lower client experience and an inefficient use of referred service provider resources.

Further, in many cases, the service provider and the referred service provider include different entities. In these cases, transmission of client information between the entities is generally ineffective. Additionally, if the nature of the client information to be transferred between entities is confidential or sensitive in nature, the client information may not be transferred between entities, as many communication techniques are not secure. For example, a service provider may not transmit any medical information to a referred service provider to avoid inappropriate maintenance of confidential medial information.

Accordingly, the present embodiments relate to implementing a platform to securely and efficiently facilitate a referral process. The platform may provide communication and information transmission between multiple devices. A service provider and referred service provider may interact and securely share client information between interactive dashboards unique to each of the service provider and referred service provider.

The platform can facilitate tracking of a client through a referral process. Particularly, the platform can allow for selective access to client information as a client is referred from a service provider to a referred service provider (or a "specialist"). The platform can securely share and store client information between the service provider and referred service provider. This can increase efficiency in providing services to a client, as the service provider and referred service provider can efficiently and securely share and access client information.

Further, the platform can facilitate communication between service provider, referred service provider, and client. These communications can be utilized in engaging with the client to increase efficiency in the referral process for the client. The service provider and referred service provider can dynamically track the progress of the referral process for multiple clients via interactive dashboards unique to each of the service provider and referred service provider.

Remarks

The description set forth herein represents the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying embodiments.

The purpose of terminology used herein is only for describing embodiments and is not intended to limit the scope of the disclosure. Where context permits, words using the singular or plural form may also include the plural or singular form, respectively.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to perform tasks as described herein.

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Environment Overview

FIG. 1 is an illustration an example network environment 100 to implement a dynamic referral process as described herein. As shown in FIG. 1, the network environment 100 can include a service provider device 102. Service provider device 102 may include an electronic device (e.g., mobile phone, tablet, computer, wearable electronic communication device) associated with a service provider. For example, a service provider device 102 can include a computer associated with a dentist.

The environment 100 can include a network-accessible server system 104. The network-accessible server system 104 can include a computing device or series of interconnected computing devices configured to perform various processing tasks and maintain information. As noted below, the network-accessible server system 104 can store/maintain both secure and unsecure information and selectively allow access to information to various devices.

The devices in the environment 100 can communicate via network (e.g., the internet) 106. Network 106 can facilitate wired and/or wireless communication via various communication protocols.

The environment 100 can include a referred service provider device 108. Referred service provider device 108 can include an electronic device associated with the referred service provider (e.g., specialist) that was referred by the service provider.

The environment 100 can include a client device 110. Client device 110 can include an electronic device associated with a client. While one client device 110 is shown, any suitable number of electronic devices can communicate with devices in the environment 100. Devices (e.g., devices 102, 108, 110) in the environment 100 may include an application configured to execute instructions on any device.

As discussed in greater detail below, devices in the environment 100 can facilitate secure data transmission and implementation of a referral dashboard for devices (e.g., devices 102, 108, 110).

Referral Process Overview

Figure 2:
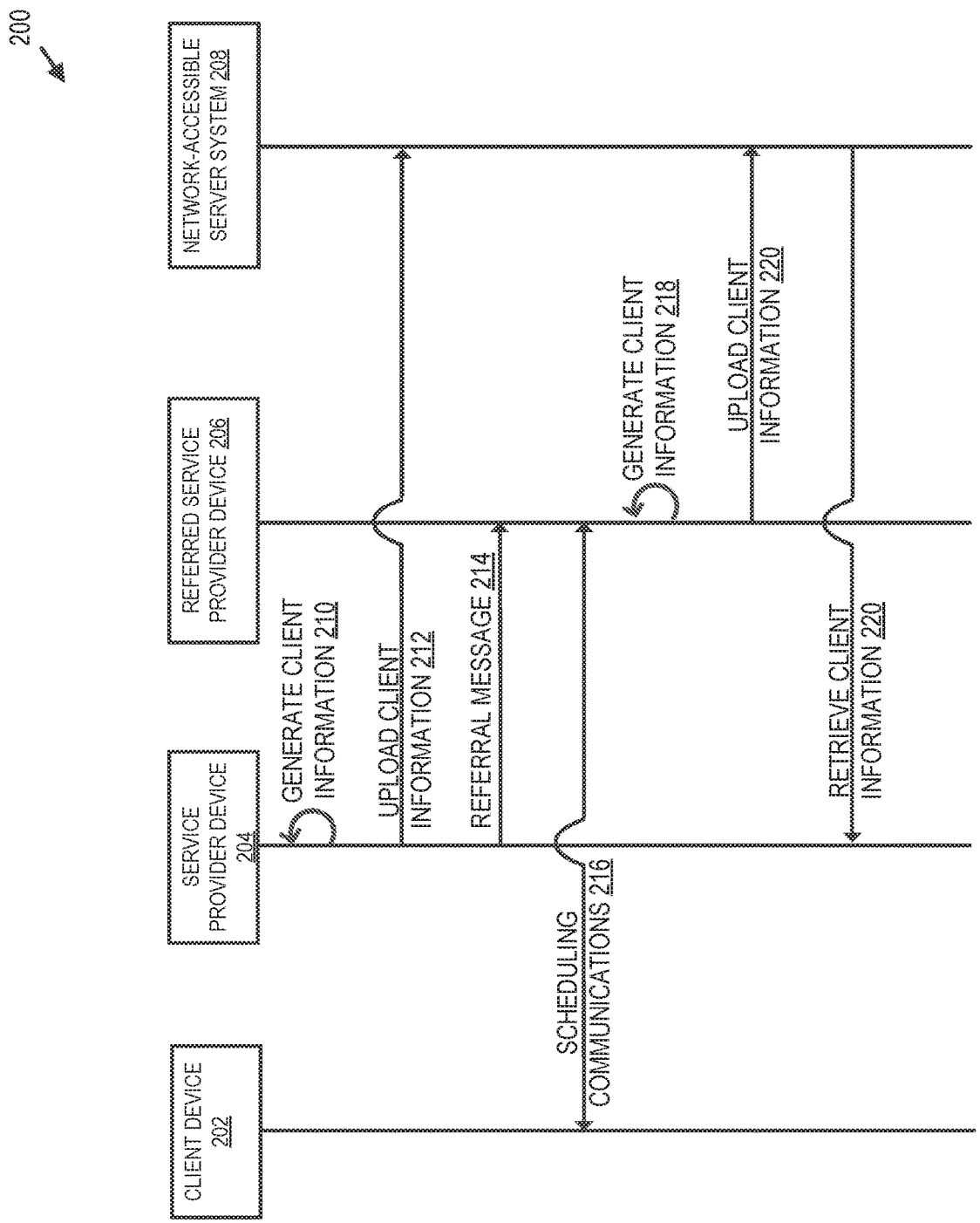
FIG. 2 is an example signaling process to implement a referral process between devices in a network.

FIG. 2 is an example signaling process 200 to implement a referral process between devices in a network. As noted above, a client (via client device 202) may first interact with a service provider (via service provider device 204). As an example, a client may have dental services performed by the service provider. During this interaction, the service provider device 204 may obtain/generate client information 210. Examples of generated client information can include personal information relating to the client, medical information relating to the client, communications between service provider and client, etc.

The service provider device 204 can upload client information 212 to the network-accessible server system 208. The network-accessible server system 208 can maintain/access information relating to a plurality of clients and service providers. For example, the network-accessible server system 208 can include a listing of a database associated with the client of the service provider. The obtained information may be accessible to the network-accessible server system 208 such that client information can be later retrieved upon receipt of a request from a device (e.g., service provider device 204, referred service provider device 206).

As noted above, a service provider can refer a client to a referred service provider. When a service provider refers a client to a referred service provider, the service provider device 204 can send a referral message 214 to the referred service provider device 206. The referral message 214 may identify the client and services to be provided by the referred services provider.

The client device 202 and referred service provider device 206 can send/receive scheduling communications 216 to schedule an appointment. This can be performed via a dashboard, which is discussed in greater detail with respect to FIG. 3.

The client may have specialized services performed by the referred service provider. In some embodiments, the referred service provider device 206 can retrieve client information from network-accessible server system 208 based on the referred service provider device 206 having access to the client information. Identifying devices/profiles with access to various portions of data in the network-accessible server system 208 is discussed in greater detail below.

The referred service provider device 206 can obtain/generate client information 218 relating to the client. The client information can be uploaded 220 to the network-accessible server system 208.

The service provider may retrieve client information after the client has services provided by a referred service provider. The service provider device 204 may retrieve client information 220 from the network-accessible server system 208. The client information may include information provided by the service provider and the referred service provider.

Referral Dashboard Overview

As noted above, any steps of the above-mentioned referral process may be implemented by a referral dashboard. The referral dashboard can be an interactive dashboard displayed on devices (e.g., service provider device 102, referred service provider device 108, client device 110) and generated by a network-accessible server system (e.g., network-accessible server system 104). The referral dashboard may be modified based on a profile associated with an entity (e.g., a service provider, client).

Figure 3:
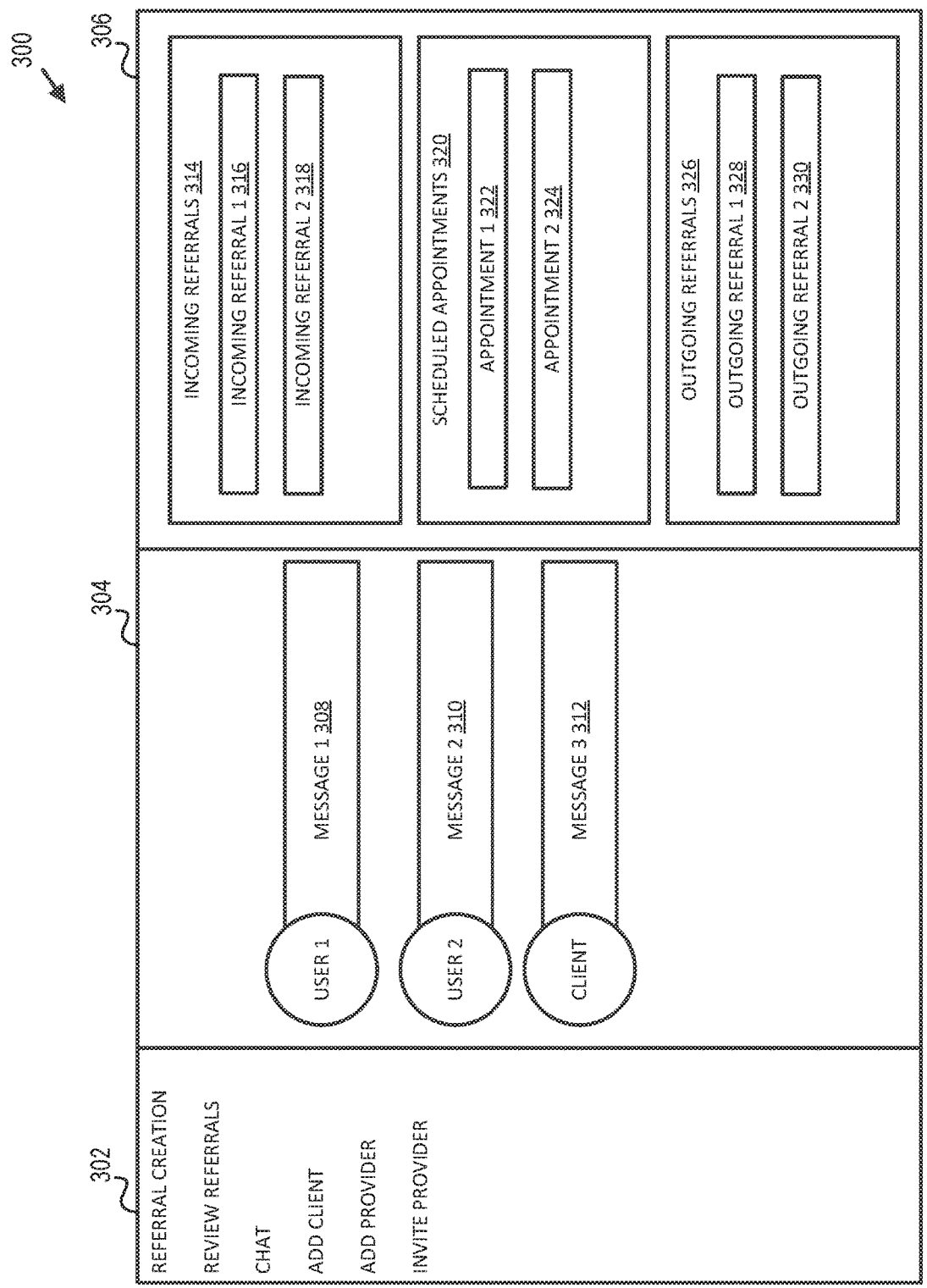
FIG. 3 is an example interactive dashboard.

FIG. 3 is an example interactive dashboard 300. As shown in FIG. 3, the dashboard 300 can include multiple regions that facilitate various functionalities. For example, a first region 302 can allow a user (e.g., a client, service provider) to navigate various features provided in the dashboard 300.

Example features that can be provided in the dashboard 300 can include a new referral creation feature, a review referral feature, a chat feature, an add client feature, an add provider feature, an invite provider feature, etc. Upon selecting (e.g., clicking) on any feature in the first region 302, the dashboard 300 may populate with information relating to the selected feature. For example, if an add client feature is selected, the dashboard may present a screen that allows for a new client to be added to the system.

The first region 302 can include a provider invitation window. The provider invitation window can allow for a provider on the platform to easily identify and invite a service provider on the platform. Particularly, the system can inspect a database/registry of service providers to retrieve information relating to all known service providers. Upon retrieving all known service providers, the system can identify all service providers that are included in the platform. This can be performed by comparing the information retrieved from the database/registry with information provided by a service provider in the platform to determine whether the information matches the information provided by a service provider in the platform.

In operation, a service provider on the interface 302 can select a referred service provider using the provider invitation window. The service provider can identify the referred service provider by performing a search for a referred service provider. Responsive to the search criteria, a list of potential referred service providers can be provided.

In some embodiments, responsive to selection of a referred service provider, information for the referred service provider can populate based on information retrieved from an external database/registry. If the referred service provider is not included in the platform, an invitation to the referred service provider can be sent to the referred service provider. In other words, upon a selection by a service provider, an invitation to join the platform can be sent to the referred service provider.

In some embodiments, a listing of all known potential service providers may be retrieved from an external database. The external database may include an industry-wide repository of service providers within an industry, for example. an indication to refer the client to the specialist may be received. This may include a selection by a service provider to refer a client to a specialist. The specialist may be identified in the listing of all known potential service providers that corresponds to the specialist identified in the indication to refer the specialist. If the specialist is included in a listing of activated service providers, an active referral may be added to an interactive dashboard of the specialist. If the specialist is not included in a listing of activated service providers, an activation request for the specialist may be generated using contact information retrieved from the listing of all known potential service providers from an external database. The activation request may be sent to the contact information for the specialist. The specialist can activate an account on the network-accessible server system and have the client referral included on a unique interactive dashboard for the specialist. In some embodiments, the service providers and/or specialists can update the database to include themselves or other service providers to the platform.

The dashboard 300 can include a messaging interface 304. The messaging interface 304 may allow for digital communication (e.g., text, audio, video) between various users. For example, in the embodiment as shown in FIG. 3, user 1 (e.g., a service provider) can send message 1 308 to a second user or a client. a user can receive a message (e.g., message 2 310) from a second user (e.g., a referred service provider). Additionally, the user can receive a message (e.g., message 3 312) from a client.

The dashboard 300 can allow for various conversations to take place between various users. For example, a service provider can communicate with a referred service provider in a first chat window and with a client in a second chat window. The user (e.g., a service provider) can navigate between multiple chats and add new participants to the chat in the messaging interface 304.

The messaging interface 304 can allow for secure and efficient document transfer and sharing between authorized users. For example, a service provider can dynamically send client information to a referred service provider via a network-accessible server system. This may increase efficiency and security in data transfer between authorized entities.

In some embodiments, service providers can securely transmit client information for a client via dashboard 300. For example, a service provider can upload client records to the network-accessible server system, and a referred service provider can access the uploaded client records via dashboard 300. The dashboard 300 can allow for selective access to various information while maintaining security of the information transmitted via dashboard 300.

Information included in various message received/transmitted by a user may be stored or maintained by the network-accessible server system. This information can be parsed and inspected to derive a nature of the communication. As described in greater detail below, the information in communications can be stored in the network-accessible server system and accessible only to a subset of users.

The dashboard 300 can include a referral window 306. The referral window 306 can include a listing of incoming referrals 314, a listing of scheduled appointments 320, a listing of outgoing referrals 326, etc. The referral window 306 can illustrate a number of scheduled events for a service provider. Additionally, for a client, the referral window 306 can identify upcoming appointments for the client.

The listing of incoming referrals 314 may include a series of referrals provided by other service providers. For example, listing of incoming referrals 314 may include a first incoming referral 316 and a second incoming referral 318. Based on the listing of incoming referrals 314, a referred service provider can initiate a further action (e.g., schedule an appointment with a client).

The listing of incoming referrals 314 may include a status indicator representing a status of each referral. For example, a referral status indicator can indicate that the referred service provider has scheduled an appointment with the client or that the referred service provider has completed services for the client.

The dashboard 300 may update the status indicator based on a position of the client in the referral process. For example, as a client progresses through the referral process, the status indicator may be updated. The status indicator may be utilized by the service provider or referred service provider to identify the position of the client in the referral process.

A status indicator may indicate that a client has been referred to the referred service provider. Another status indicator may indicate that the client has scheduled an appointment with the referred service provider. Another status indicator may indicate that the requested services have been completed. Another status indicator may indicate that the appointment has been cancelled.

The status indicator may indicate either dynamically upon identifying that a referred service provider dashboard has been updated and/or upon an indication from the referred service provider to update the status for the client.

The listing of scheduled appointments 320 may include a series of appointments based on provided referrals. For example, listing of scheduled appointments 320 may include a first scheduled appointment 322 and a second scheduled appointment 324.

The listing of outgoing referrals 326 may include a series of referrals send to referred service providers. For example, listing of outgoing referrals 326 may include a first outgoing referral 328 and a second outgoing referral 330.

In some embodiments, after sending an outgoing referral to a referred service provider, a message may be sent to the referred service provider that includes client information and the services to be provided, which may be referred to as a "virtual referral slip." The virtual referral slip may include information relating to the client and the services to be provided for the client, which may provide an overview to the referred service provider of the referral.

Referred Service Provider Selection

As noted above, a referral process can include selecting a referred service provider to perform services for a client. For example, a dentist can identify a referred service provider (e.g., an oral surgeon) to perform specialized services for a client (e.g., perform an oral surgical procedure). In some cases, the service provider can identify a referred service provider. However, in many cases, the service provider may be unable to identify a referred service provider that can perform a specific or specialized service for a client.

Accordingly, the network-accessible server system may compare characteristics of a client to be referred with a plurality of potential service providers to identify a referred service provider best suited to perform a specialized task for a client.

Figure 4:
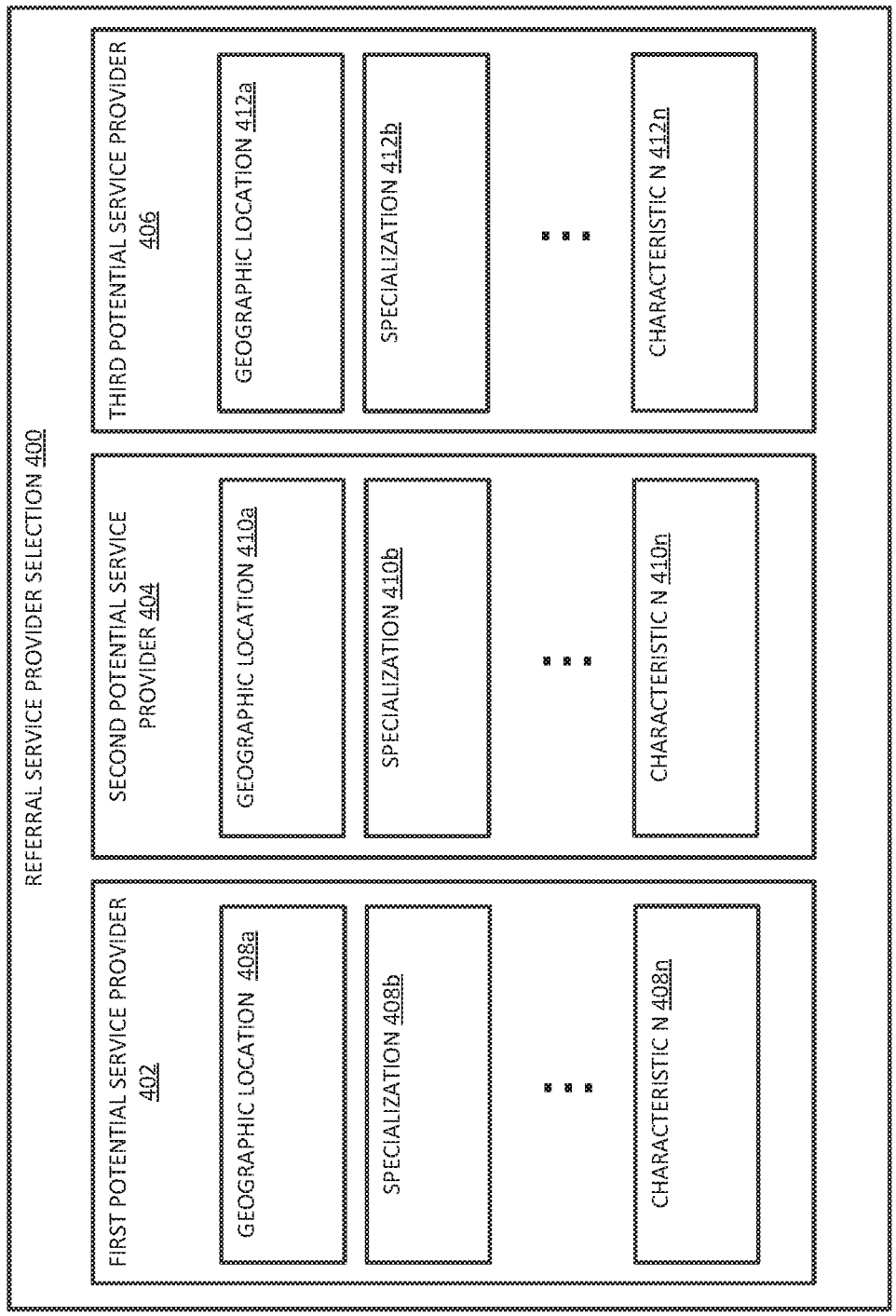
FIG. 4 is an example block diagram of a referral service provider selection module.

FIG. 4 is an example block diagram of a referral service provider selection module 400. As shown in FIG. 4, the referral service provider selection module 400 can store/access information relating to multiple service providers. For example, referral service provider selection module 400 can include information relating to a first potential service provider 402, a second potential service provider 404, a third potential service provider 406, etc.

Each potential service provider included in the referral service provider selection module 400 may be associated a series of characteristics relating to the potential service provider. The series of characteristics relating to the potential service provider can identify features relating to the potential service provider. For example, a first potential service provider 402 can include a geographic location characteristic 408a, a specialization characteristics 408b, and any other number of characteristics 408n. Similarly, second potential service provider 404 can include a geographic location characteristic 410a, a specialization characteristics 410b, and any other number of characteristics 108n. Additionally, the third potential service provider 406 can include a geographic location characteristic 412a, a specialization characteristics 412b, and any other number of characteristics 412n.

The characteristics of each potential service provider can be compared with information relating to the client. For example, information relating to the client can include a type of services requested, a geographic location of the client, etc. If characteristics of a potential service provider matches or is within a threshold similarity to the characteristics of a client, the potential service provider may be matched to the client. In this event, the selected service provider is provided information of the client and can initiate scheduling communication with the client to schedule an appointment with the client.

In some embodiments, selection of a service provider can include weighing the characteristics of each service provider that can be compared with the characteristics of the client. For example, if a potential service provider is outside a threshold geographic region of the client or provides services unrelated to the services for the client, the potential service provider may be rejected from being matched with the client.

Selective Access of Client Information

As noted above, a network-accessible server system may store information relating to clients. For example, the network-accessible server system may maintain a listing of information relating to a client, such as contact information, services history information, medical information, etc.

However, in many cases, information stored for a client can be sensitive or confidential in nature. For example, sensitive business-related information or medical information may be stored for a client. For instance, multiple service providers may upload medical information relating to a client to the network-accessible server system.

To ensure security of client information, the network-accessible server system may selectively allow access for a specific subset of users. For example, information for a client may only be accessible by a service provider and a referred service provider associated with the client. Other unauthorized users may be unable to view/access the client information. This may allow for secure data transmission/access and increased with increased efficiency between authorized users.

Figure 5:
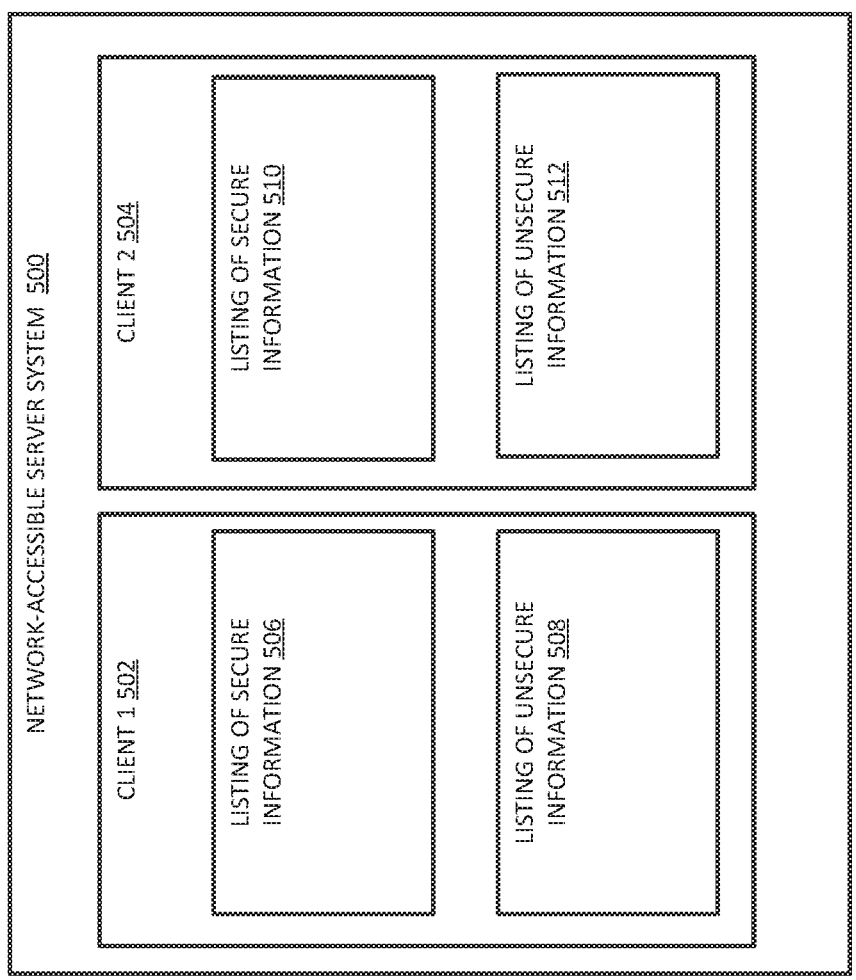
FIG. 5 is a block diagram of an example network-accessible server system capable of accessing information relating to various clients.

FIG. 5 is a block diagram of an example network-accessible server system 500 capable of accessing information relating to various clients. As shown in FIG. 5, the network-accessible server system 500 can store information relating to multiple clients (e.g., client 1 502, client 2 504). The network-accessible server system 500 can maintain separate listings of information for each client to prevent inadvertent/unauthorized access to client information.

The network-accessible server system 500 may maintain a listing of secure information 506, 510 and a listing of unsecure information 508, 512 for a client 502, 504. The listing of secure information 506, 510 can include information that is sensitive in nature, such as personal information or medical information, for example. In some instances, the listing of secure information 506, 510 can be encrypted and only accessible by authorized users.

The network-accessible server system 500 may maintain a listing of authorized users for information relating to each client. For example, the network-accessible server system 500 may determine whether a user is authorized to access secure information (e.g., medical records) in the listing of secure information 506 by comparing a user identifier for the user with the listing of authorized users allowed access to the listing of secure information 506.

In some embodiments, upon determining that a user is authorized to access requested secure information, the network-accessible server system 500 can securely send the requested information to a device associated with the user. This may include encrypting the secure information using a suitable encryption technique, such as RSA, Advanced Encryption Standard (AES), or Triple Data Encryption Standard (3DES), for example.

The network-accessible server system 500 may include separate listings of users allowed to access the listing of secure information for a client and the listing of unsecure information for the client. For example, only a service provider and a referred service provider may have access to the listing of secure information for a client, where other users can access the listing of unsecure information for the client.

In some embodiments, the network-accessible server system 500 may inspect information to classify the information as either secure information or unsecure information. This may include parsing received information (e.g., uploaded client records, messages between users) to determine whether the information is sensitive/confidential in nature. For example, if received information is a medical record, the network-accessible server system 500 may include the received information in a listing of secure information for the client.

Figure 6:
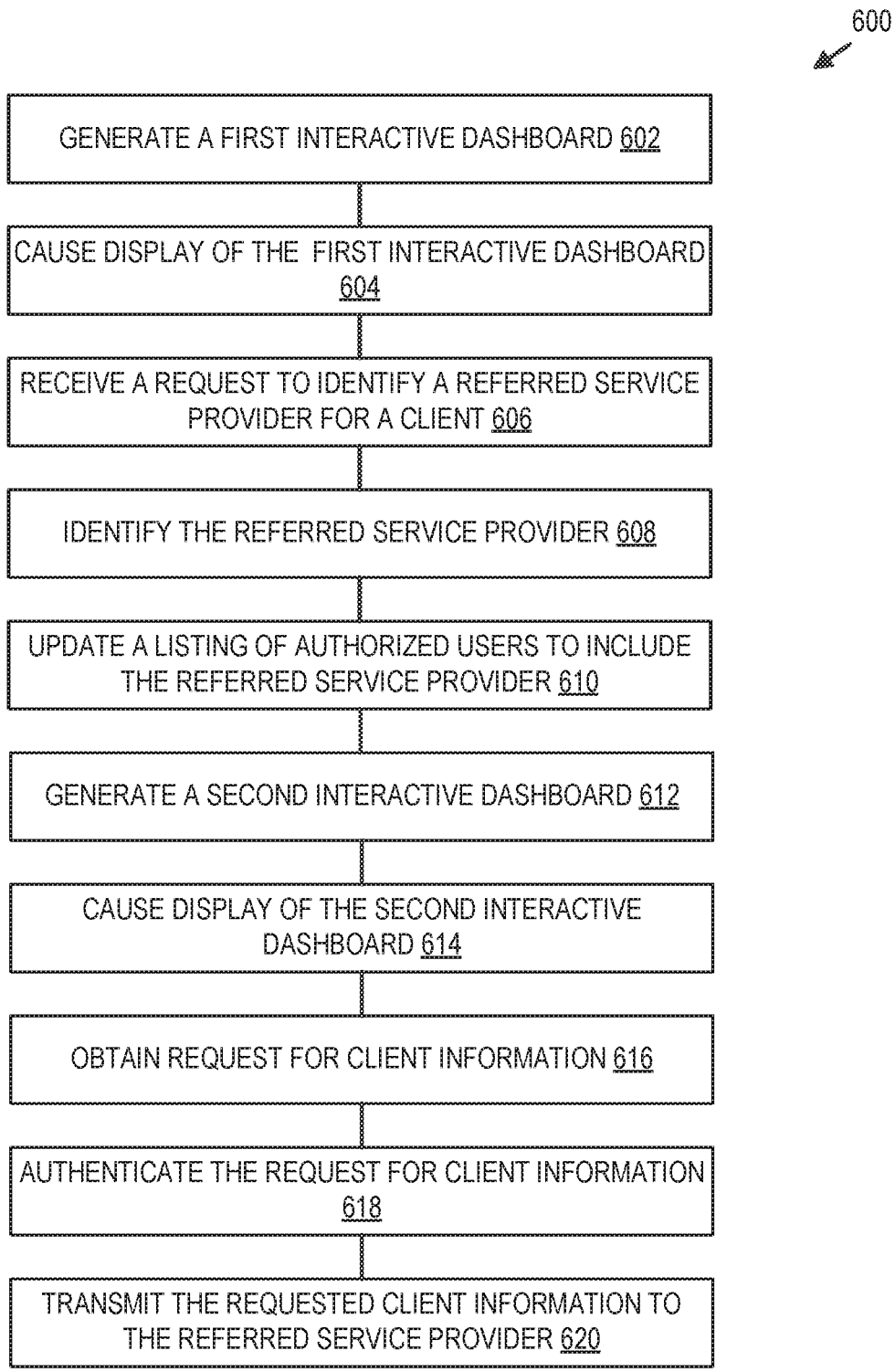
FIG. 6 is a block diagram of an example method to dynamically facilitate secure information transmission in a referral process.

FIG. 6 is a block diagram of an example method 600 to dynamically facilitate secure information transmission in a referral process. As noted above, client information may be securely stored and access by authorized users. For example, a service provider can refer a referred service provider to provide services for a client. In this example, the service provider and referred service provider can access and share client information via an interactive dashboard.

The method may include generating a first interactive dashboard unique to a service provider device associated with a service provider (block 602). The first interactive dashboard can include information specific to the service provider.

In some embodiments, any of the first interactive dashboard and second interactive dashboard can include a messaging interface allowing for electronic communication between each of the first interactive dashboard and second interactive dashboard and another device, a referral interface providing a listing of active referrals associated with any of the service provider or referred service provider, the listing of active referrals including a status indicator for each active referral, and a client information interface allowing display of client information relating to the client.

In some embodiments, a new set of client information may be received from any of the first interactive dashboard associated with the service provider or the second interactive dashboard associated with the service provider. The new set of client information can include information relating to the client, such as medical information or electronic communications between service provider and client, for example. The new client information can be stored in the listing of client information associated with the client.

The method may include causing display of the first interactive dashboard on the service provider device (block 604). For example, the first interactive dashboard can include an application executing on the service provider device.

The method may include receiving a request to identify a referred service provider for a client via the first interactive dashboard (block 606). This request may be sent responsive to determining that a referred service provider (or specialist) is needed for a client.

The method may include identifying the referred service provider (block 608). In some embodiments, the service provider may identify a referred service provider in the request to identify the referred service provider.

In other embodiments, a referred service provider can be identified automatically by comparing client characteristics against a plurality of potential service providers. For example, client characteristics (e.g., client location, services to be provided) can be compared against known information relating to the potential service provider to identify a referred service provider. The method may include identifying a series of client characteristics from the first interactive dashboard associated with the service provider, the series of client characteristics indicative of characteristics of the client and services to be provided for the client. The method may also include comparing the series of client characteristics with a listing of potential service providers to identify a first potential service provider with listed characteristics that is within a threshold similarity of the series of client characteristics, the first potential service provider including the referred service provider.

The method may include updating a listing of authorized users that are allowed access to client information relating to the client to include the referred service provider (block 610). The listing of authorized users may be updated responsive to identifying the referred service provider.

In some embodiments, the method may include responsive to updating the listing of authorized users to include the referred service provider, allowing transmission and reception of electronic communications on the second interactive dashboard associated with the referred service provider and a client device associated with the client.

The method may include generating a second interactive dashboard unique to a referred service provider device associated with the referred service provider (block 612).

In some embodiments, the requested client information sent to the referred service provider device is encrypted and only viewable by the referred service provider device via the second interactive dashboard.

The method may include causing display of the second interactive dashboard on the referred service provider device (block 614). The second interactive dashboard may be unique to the referred service provider device and include information specific to the referred service provider.

In some embodiments, the method may include receiving a request to send a subset of client information relating to the client from the first interactive dashboard associated with the service provider to the second interactive dashboard associated with the referred service provider. The method may also include determining whether the service provider and the referred service provider are included in the listing of authorized users that are allowed access to the client information relating to the client. Responsive to determining that the service provider and the referred service provider are included in the listing of authorized users, the method may include sending the subset of client information to the second interactive dashboard to be viewed by the referred service provider.

In some embodiments, the method may include parsing any electronic communications sent between the second interactive dashboard associated with the referred service provider and the client device associated with the client to derive text. The method may also include inspecting the derived text to determine whether the derived text includes sensitive client information. Responsive to determining that the derived text includes sensitive client information, the method may include storing the derived text in portion of memory including sensitive client information.

The method may include obtaining a request for client information relating to the client via the second interactive dashboard (block 616). This request may include a request by the referred service provider to retrieve client information relating to the client referred by the service provider.

In some embodiments, a listing of client information may include both a secure portion and an unsecure portion of client information. The secure portion of client information may include sensitive client information (e.g., personal client information, medical information). The unsecure portion of client information may include unsecure or public information, such as messaging information or social media information, for example. A first subset of authorized users may be configured to access the secure portion of the listing of client information. Similarly, a second subset of authorized users may be configured to access the unsecure portion of the listing of client information.

The method may include authenticating the request for client information (block 618). This may be performed by determining whether the referred service provider identified in the request for client information is included in the listing of authorized users.

The method may include transmitting the requested client information to the referred service provider device (block 620). This may be performed responsive to determining that the request for client information is authenticated. The requested client information may be viewable by the second interactive dashboard.

Example Processing System

Figure 7:
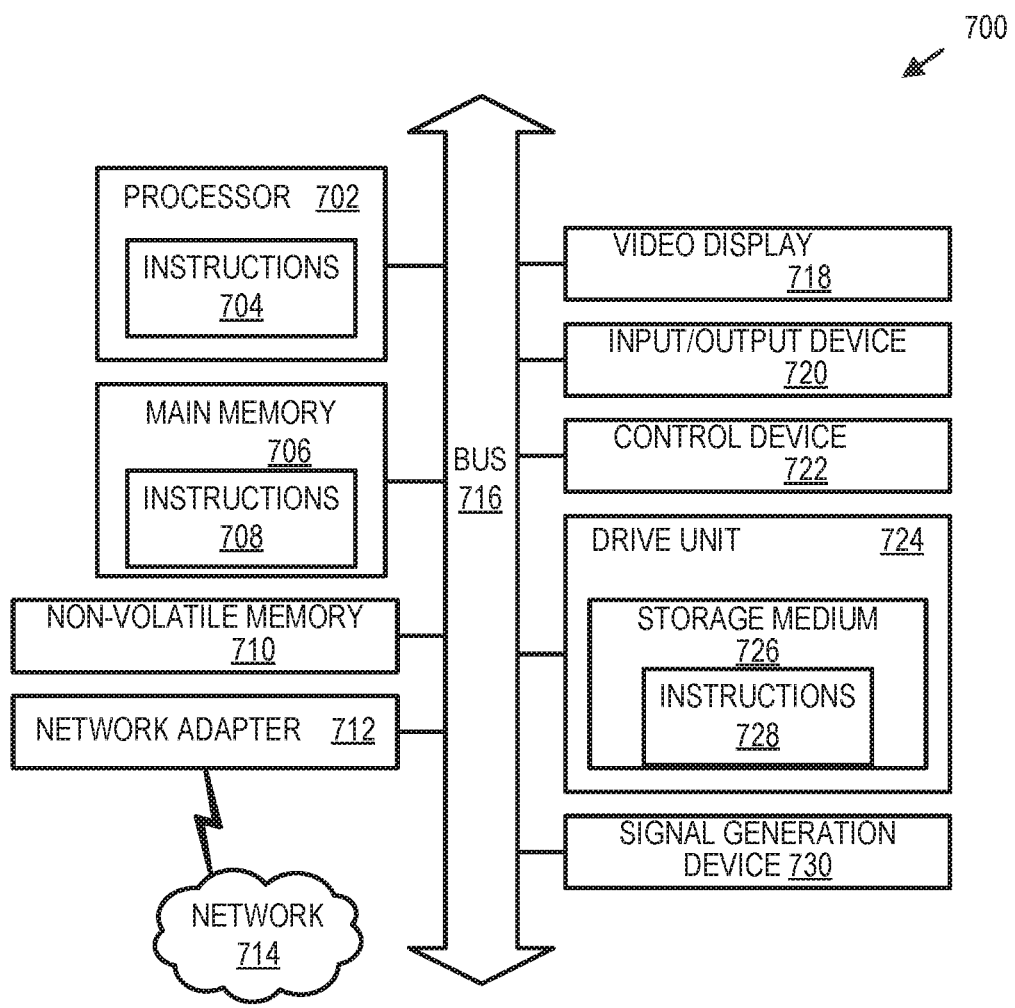
FIG. 7 is a block diagram illustrating an example of a processing system in which at least some operations described herein can be implemented.

FIG. 7 is a block diagram illustrating an example of a processing system 700 in which at least some operations described herein can be implemented. For example, some components of the processing system 700 may be hosted on a computing device (e.g., service provider device 102 of FIG. 1, network-accessible server system 104 of FIG. 1).

The processing system 700 may include one or more central processing units ("processors") 702, main memory 706, non-volatile memory 710, network adapter 712 (e.g., network interface), video display 718, input/output devices 720, control device 722 (e.g., keyboard and pointing devices), drive unit 724 including a storage medium 726, and signal generation device 730 that are communicatively connected to a bus 716. The bus 716 is illustrated as an abstraction that represents one or more physical buses and/or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 700 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the processing system 700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in a computing device. When read and executed by the one or more processors 702, the instruction(s) cause the processing system 700 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 710, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 712 enables the processing system 700 to mediate data in a network 714 with an entity that is external to the processing system 700 through any communication protocol supported by the processing system 700 and the external entity. The network adapter 712 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 712 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

What is claimed is:

1. A method performed by a network-accessible server system to dynamically facilitate secure information transmission during a referral process, the method comprising:
    causing display of a first interactive dashboard unique to a service provider on a service provider device;
    receiving a request to identify a referred service provider for a client via the first interactive dashboard;
    identifying the referred service provider based on receiving the request to identify the referred service provider;
    responsive to identifying the referred service provider, updating a listing of authorized users allowed access to client information relating to the client to include the referred service provider;
    causing display of the second interactive dashboard unique to the referred service provider on a referred service provider device;
    obtaining a request for client information relating to the client via the second interactive dashboard;
    authenticating the request for client information by determining whether the referred service provider identified in the request for client information is included in the listing of authorized users; and
    responsive to determining that the request for client information is authenticated, transmitting the requested client information to the referred service provider device, the requested client information viewable by the second interactive dashboard.

2. The method of claim 1, wherein the first interactive dashboard and the second interactive dashboard includes:
    a messaging portion facilitating electronic communication between each of the first interactive dashboard and second interactive dashboard and another device;
    a referral portion that provides a listing of active referrals associated with any of the service provider or referred service provider, the listing of active referrals including a status indicator for each active referral; and
    a client information portion facilitating display of client information relating to the client.

3. The method of claim 2, further comprising:
    responsive to identifying the referred service provider:
        sending a client referral notification message to the second interactive dashboard providing contact information relating to the client and a description of services to be provided to the client; and
        updating the referral portion of the second interactive dashboard to include a new active referral to the listing of active referrals associated with the client.

4. The method of claim 1, further comprising:
    receiving a request to send a subset of client information relating to the client from the first interactive dashboard to the second interactive dashboard;
    determining whether the service provider and the referred service provider are included in the listing of authorized users that are allowed access to the client information relating to the client; and
    responsive to determining that the service provider and the referred service provider are included in the listing of authorized users, sending the subset of client information to the second interactive dashboard to be displayed on the second interactive dashboard.

5. The method of claim 1, further comprising:
    responsive to updating the listing of authorized users to include the referred service provider, allowing transmission and reception of electronic communications between the second interactive dashboard associated with the referred service provider and a client device associated with the client.

6. The method of claim 5, further comprising;
    parsing any electronic communications sent between the second interactive dashboard and the client device to derive text in the electronic communications; and
    storing the derived text in a portion of memory storing the client information relating to the client.

7. The method of claim 6, further comprising:
    obtaining new client information relating to the client from any of the first interactive dashboard or the second interactive dashboard; and
    uploading the new client information in the portion of memory storing the client information relating to the client.

8. The method of claim 1, wherein the requested client information sent to the second interactive dashboard is encrypted and only viewable by the referred service provider device via the second interactive dashboard.

9. The method of claim 1, wherein said identifying the referred service provider includes:
inspecting the request to identify the referred service provider to identify an indicator identifying the referred service provider; and
comparing the indicator identifying the referred service provider with a listing of potential service providers to identify a first potential service provider corresponding to the indicator, the first potential service provider including the referred service provider.

10. The method of claim 1, further comprising:
identifying a series of client characteristics indicative of characteristics of the client and services to be provided for the client; and
comparing the series of client characteristics with a listing of potential service providers to identify a first potential service provider with listed characteristics within a threshold similarity of the series of client characteristics, the first potential service provider including the referred service provider.

11. A method comprising:
obtaining a set of client information relating to a client from a service provider device associated with a service provider;
determining whether the service provider is identified as a first authorized user allowed access to a listing of client information;
responsive to determining that the service provider is identified as the first authorized user, storing the set of client information at a portion of memory maintaining the listing of client information;
receiving a request to identify a referred service provider for the client via the service provider device;
identifying the referred service provider;
responsive to identifying the referred service provider, adding the referred service provider as a second authorized user allowed access to the listing of client information;
receiving a request for the set of client information from a referred service provider device associated with the referred service provider;
authenticating the request for the set of client information by determining whether the referred service provider identified in the request for client information is allowed access to the listing of client information; and
responsive to determining that the referred service provider is the second authorized user allowed access to the listing of client information, causing display of the set of client information on the referred service provider device.

12. The method of claim 11, further comprising:
generating a first interactive dashboard unique to the service provider;
causing display of the first interactive dashboard on the service provider device;
generating a second interactive dashboard unique to the referred service provider;
causing display of the second interactive dashboard on the referred service provider device,
wherein each of the first interactive dashboard and the second interactive dashboard includes:
a messaging interface allowing for electronic communication between any of the first interactive dashboard, second interactive dashboard, and a client device;
a referral interface providing a listing of active referrals associated with any of the service provider or referred service provider, the listing of active referrals including a status indicator for each active referral; and
a client information interface allowing display of client information relating to the client.

13. The method of claim 12, further comprising:
identifying a series of client characteristics indicative of characteristics of the client and services to be provided for the client; and
comparing the series of client characteristics with a listing of potential service providers to identify a first potential service provider with listed characteristics that is within a threshold similarity of the series of client characteristics, the first potential service provider including the referred service provider.

14. The method of claim 13, further comprising:
responsive to identifying the referred service provider:
sending a client referral notification message to the second interactive dashboard providing contact information relating to the client and a description of services to be provided to the client; and
updating the referral interface to include a new active referral to the listing of active referrals associated with the client.

15. The method of claim 11, further comprising:
obtaining a new set of client information relating to the client from the service provider device;
parsing the new set of client information to identify a first part of the new set of client information including medical information and a second part of the new set of client information including non-medical client information;
storing the first part of the new set of client information at a first portion of memory and the second part of the new set of client information at a second portion of memory.

16. A non-transitory computer-readable medium with instructions stored thereon that, when executed by a processor, cause the processor to perform operations comprising:
cause display of a first interface unique to a service provider on a service provider device;
receive a request to identify a referred service provider for a client via the first interface;
identify the referred service provider based on receiving the request to identify the referred service provider;
cause display of a second interface unique to a referred service provider on a referred service provider device, each of the first interface and second interface including:
a messaging interface facilitating electronic communication between the first interface, second interface, and a client device;
a referral interface providing a listing of active referrals associated with any of the service provider or the referred service provider; and
a client information interface facilitating display of client information relating to the client;
responsive to identifying the referred service provider, add the referred service provider to a listing of authorized users allowed access to the client information;

receive a request for client information via the second interface;

authenticate the referred service provider by determining that the referred service provider is included in the listing of authorized users;

responsive to authenticating the referred service provider, cause display of the requested client information on the second interface.

17. The computer-readable medium of claim 16, wherein said identify the referred service provider further includes:

identify a series of client characteristics from the first interface, the series of client characteristics indicative of characteristics of the client and services to be provided for the client; and compare the series of client characteristics with a listing of potential service providers to identify a first potential service provider with listed characteristics that is within a threshold similarity of the series of client characteristics, the first potential service provider including the referred service provider.

18. The computer-readable medium of claim 16, wherein said identify the referred service provider further includes:

inspect the request to identify the referred service provider to identify an indicator identifying the referred service provider; and compare the indicator identifying the referred service provider with a listing of potential service providers to identify a first potential service provider corresponding to the indicator, the first potential service provider including the referred service provider.

19. The computer-readable medium of claim 18, the instructions further causing the processor to:

responsive to identifying the referred service provider:

send a client referral notification message to the second interface providing contact information relating to the client and a description of services to be provided to the client; and update the referral interface of the second interface to include a new active referral to the listing of active referrals associated with the client.

20. The computer-readable medium of claim 18, the instructions further causing the processor to:

identify an electronic communication sent between the client device and the messaging interface of the second interface;

parse the electronic communication to derive text included in the electronic communication;

storing the derived text in a portion of memory associated with the client information.

21. A method performed by a network-accessible server system to securely transmit information during a referral process, the method comprising:

causing display of a first interactive dashboard unique to a dentist on a first electronic device;

receiving a set of client information relating to a client via the first interactive dashboard, the set of client information relating to documents generated during performance of services by the dentist;

storing the set of client information;

receiving a request to identify a specialist for a client to perform specialized dental services via the first interactive dashboard;

identifying the specialist based on receiving the request to identify the specialist;

responsive to identifying the specialist, updating a listing of authorized users allowed access to client information relating to the client to include the specialist;

causing display of the second interactive dashboard unique to the specialist on a second electronic device;

obtaining a request for the set of client information relating to the client via the second interactive dashboard;

authenticating the request for client information by determining whether the specialist is included in the listing of authorized users; and responsive to determining that the specialist is included in the listing of authorized users, transmitting the requested set of client information to be viewed by the second interactive dashboard.

22. The method of claim 21, wherein the first interactive dashboard and the second interactive dashboard includes:

a messaging portion facilitating electronic communication between each of the first interactive dashboard and second interactive dashboard and a client device;

a referral portion that provides a listing of active referrals associated with any of the dentist or specialist, the listing of active referrals including a status indicator for each active referral; and a client information portion facilitating display of client information relating to the client.

23. The method of claim 22, further comprising:

responsive to identifying the specialist:

sending a client referral notification message to the second interactive dashboard providing contact information relating to the client and a description of services to be provided to the client; and updating the referral portion of the second interactive dashboard to include a new active referral to the listing of active referrals associated with the client.

24. The method of claim 21, further comprising:

identifying a series of client characteristics indicative of characteristics of the client and services to be provided for the client; and comparing the series of client characteristics with a listing of potential service providers to identify a first potential service provider with listed characteristics within a threshold similarity of the series of client characteristics, the first potential service provider including the specialist.

25. A method comprising:

causing display of a first interactive dashboard unique to a dentist on a first electronic device and a second interactive dashboard unique to a specialist on a second electronic device, each interactive dashboard including:

a messaging interface facilitating electronic communication between the first interactive dashboard, second interactive dashboard, and a client device;

a referral interface providing a listing of active referrals associated with any of the dentist or the specialist; and a client information interface facilitating display of client information relating to a client;

receiving a referral request from the first interactive dashboard, the referral request indicative of the specialist to provide specialized services for the client;

authenticating the request for client information by determining whether the specialist is included in the listing of authorized users;

responsive to determining that the specialist is included in the listing of authorized users, transmitting the requested set of client information to be viewed by the second interactive dashboard; and updating the referral interface of each of the first interactive dashboard and the second interactive dashboard to include a first active referral relating to the client.

26. The method of claim 25, further comprising:

identifying a series of client characteristics indicative of characteristics of the client and services to be provided for the client; and comparing the series of client characteristics with a listing of potential service providers to identify a first potential service provider with listed characteristics that is within a threshold similarity of the series of client characteristics, the first potential service provider including the specialist.

27. The method of claim 26, further comprising:

responsive to receiving the referral request:
  sending a client referral notification message to the second interactive dashboard providing contact information relating to the client and a description of services to be provided to the client; and
  updating an indicator relating to the first active listing on the referral interface to indicate that the specialist has obtained client information relating to the client.

28. The method of claim 25, further comprising:

obtaining a new set of client information relating to the client via the first interactive dashboard;

parsing the new set of client information to identify a first part of the new set of client information including medical information and a second part of the new set of client information including non-medical client information;

storing the first part of the new set of client information at a first portion of memory and the second part of the new set of client information at a second portion of memory.

29. The method of claim 25, further comprising:

retrieving a listing of all known potential service providers from an external database;

receiving an indication to refer the client to the specialist;

identifying the specialist in the listing of all known potential service providers that corresponds to the specialist identified in the indication to refer the specialist;

determining that the specialist is not included in a listing of activated service providers; and responsive to determining that the specialist is not included in the listing of activated service providers, generating an activation request for the specialist using contact information retrieved from the listing of all known potential service providers from an external database; and sending the activation request to the specialist.

* * * * *